(12) United States Patent
Kang et al.

(10) Patent No.: US 11,139,688 B2
(45) Date of Patent: Oct. 5, 2021

(54) APPARATUS AND METHOD FOR WIRELESS POWER TRANSMISSION

(71) Applicant: Samsung Electronics Co., Ltd, Gyeonggi-do (KR)

(72) Inventors: Noh-Gyoung Kang, Seoul (KR); Seung-Hoon Park, Seoul (KR); Jae-Seung Son, Gyeonggi-do (KR); Chi-Hong Cho, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 396 days.

(21) Appl. No.: 13/780,852

(22) Filed: Feb. 28, 2013

(65) Prior Publication Data

US 2013/0225082 A1   Aug. 29, 2013

(30) Foreign Application Priority Data

Feb. 28, 2012   (KR) .................. 10-2012-0020096

(51) Int. Cl.
*H02J 50/12* (2016.01)
*H04B 7/26* (2006.01)
(Continued)

(52) U.S. Cl.
CPC .............. *H02J 50/12* (2016.02); *H02J 50/40* (2016.02); *H02J 50/80* (2016.02); *H02J 50/90* (2016.02);
(Continued)

(58) Field of Classification Search
CPC .. H02J 5/005; H02J 7/025; H02J 17/00; H02J 50/12; H02J 50/90; H02J 50/80;
(Continued)

(56) References Cited

U.S. PATENT DOCUMENTS

| | | | |
|---|---|---|---|
| 6,256,509 B1 * | 7/2001 | Tanaka | H04W 72/005 370/336 |
| 6,421,600 B1 * | 7/2002 | Ross | B60L 5/005 180/167 |

(Continued)

FOREIGN PATENT DOCUMENTS

| | | |
|---|---|---|
| EP | 2568572 A1 | 3/2013 |
| KR | 10-2012-0005484 A | 1/2012 |

OTHER PUBLICATIONS

Extended European Search Report dated May 24, 2013 in connection with European Patent Application No. 13157026.9, 8 pages.

(Continued)

*Primary Examiner* — Pinping Sun

(57) ABSTRACT

A power supply apparatus for wirelessly supplying power to one or more terminals includes a signal transceiver configured to receive a charging state message indicating a charging state from the one or more terminals, a display unit configured to display the charging state of each of the one or more terminals based on the charging state message, an interface unit configured to receive a charging control signal for controlling a charging operation of each of the one or more terminals, a controller configured to control the signal transceiver to transmit a power reception control signal for controlling whether the one or more terminals receive power by analyzing the charging control signal for the one or more terminals and a power supplier configured to wirelessly supply power to the one or more terminals under a control of the controller.

18 Claims, 7 Drawing Sheets

(51) Int. Cl.
- *H04B 5/00* (2006.01)
- *H02J 50/40* (2016.01)
- *H02J 50/80* (2016.01)
- *H02J 50/90* (2016.01)
- *H02J 7/00* (2006.01)

(52) U.S. Cl.
CPC ............ *H04B 5/0037* (2013.01); *H04B 7/26* (2013.01); *H02J 7/0013* (2013.01); *H02J 7/0021* (2013.01)

(58) Field of Classification Search
CPC ........ H02J 50/40; H02J 7/0013; H02J 7/0021; H01F 38/14; B60L 11/182; H04B 5/0037; H04B 7/26
USPC .......................................................... 307/104
See application file for complete search history.

(56) References Cited

U.S. PATENT DOCUMENTS

| | | | | |
|---|---|---|---|---|
| 6,617,827 | B2* | 9/2003 | Knish | H02J 7/0027 320/121 |
| 7,002,922 | B1* | 2/2006 | Shigenari | H04L 12/14 370/253 |
| 8,410,633 | B2* | 4/2013 | Batzler | H02J 9/08 307/41 |
| 8,890,473 | B2* | 11/2014 | Muller | B60L 53/65 320/109 |
| 8,970,180 | B2* | 3/2015 | Li | H02J 50/10 320/155 |
| 2008/0258679 | A1* | 10/2008 | Manico | H02J 50/10 320/106 |
| 2009/0146608 | A1* | 6/2009 | Lee | H02J 7/025 320/108 |
| 2010/0171461 | A1* | 7/2010 | Baarman | H01F 38/14 320/108 |
| 2010/0201533 | A1* | 8/2010 | Kirby | H02J 7/025 340/636.1 |
| 2010/0213895 | A1* | 8/2010 | Keating | H02J 7/025 320/108 |
| 2010/0248622 | A1* | 9/2010 | Lyell Kirby | H02J 50/40 455/41.1 |
| 2010/0253281 | A1* | 10/2010 | Li | H02J 7/0027 320/108 |
| 2010/0295503 | A1* | 11/2010 | Bourilkov | H02J 7/0068 320/106 |
| 2010/0315045 | A1* | 12/2010 | Zeine | H02J 50/80 320/137 |
| 2011/0084658 | A1* | 4/2011 | Yamamoto | B60L 5/005 320/108 |
| 2011/0156640 | A1 | 6/2011 | Moshfeghi | |
| 2011/0196545 | A1* | 8/2011 | Miwa | B60L 53/18 700/292 |
| 2011/0221389 | A1* | 9/2011 | Won | H04B 5/0037 320/108 |
| 2011/0298297 | A1* | 12/2011 | van Wageningen | H02J 50/40 307/104 |
| 2012/0004000 | A1* | 1/2012 | Choi | H02J 7/0044 455/507 |
| 2012/0007549 | A1* | 1/2012 | Murayama | H02J 7/025 320/108 |
| 2012/0161530 | A1* | 6/2012 | Urano | H02J 7/025 307/104 |
| 2013/0026981 | A1* | 1/2013 | Van Der Lee | H04B 5/0075 320/108 |
| 2013/0169221 | A1* | 7/2013 | Suzuki | H02J 50/90 320/108 |
| 2013/0271080 | A1* | 10/2013 | Yoshida | H02J 7/00 320/109 |
| 2016/0371415 | A1* | 12/2016 | Vanapalli | G06F 30/39 |

OTHER PUBLICATIONS

Korean Intellectual Property Office, "Notification of the Reasons for Rejection," Application No. KR 10-2012-0020096, dated Aug. 28, 2018, 9 pages.

* cited by examiner

APPARATUS AND METHOD FOR WIRELESS POWER TRANSMISSION

CROSS-REFERENCE TO RELATED APPLICATION(S) AND CLAIM OF PRIORITY

The present application is related to and claims the priority under 35 U.S.C. § 119(a) to Korean Application Ser. No. 10-2012-0020096, which was filed in the Korean Intellectual Property Office on Feb. 28, 2012, the entire content of which is hereby incorporated by reference.

TECHNICAL FIELD

The present disclosure relates to a wireless power supply apparatus and a control method thereof, and a terminal for wirelessly receiving power and a control method thereof.

BACKGROUND

Mobile terminals such as a mobile phone, a PDA (Personal Digital Assistant) and the like are driven with rechargeable batteries due to their nature, and the battery of the mobile terminal is charged through supplied electronic energy by using a separate charging apparatus. In general, a separate contact terminal is arranged outside the charging apparatus and the battery, and the charging apparatus and the battery are electrically connected to each other through contact between them.

However, since the contact terminal is outwardly protruded in such a contact type charging scheme, the contact terminal is easily contaminated by foreign substances and thus the battery charging is not correctly performed. Further, the battery charging may also not be correctly performed in a case where the contact terminal is exposed to moisture.

Recently, a wireless charging or a non-contact charging technology is developed and used for electronic devices to solve the above-mentioned problem.

Such a wireless charging technology employs wireless power transmission/reception, and corresponds to, for example, systems in which a battery can be automatically charged. The wireless charging technology is generally known to be used for a wireless electric toothbrush or a wireless electric shaver. Accordingly, a waterproof function can be improved since electronic products are wirelessly charged through the wireless charging technology, and the portability of electronic devices can be increased since there is no need to provide a wired charging apparatus. Therefore, technologies related to the wireless charging technology are expected to be significantly developed in the coming age of electric cars.

The wireless charging technologies are largely classified into an electromagnetic induction scheme using a coil, a resonance scheme using a resonance, and an RF/microwave radiation scheme converting electrical energy to a microwave and then transmitting the microwave.

It is considered up to now that the electromagnetic induction scheme is mainstream, but it is expected that the day will come when all electronic products are wirelessly charged, anytime and anywhere, without a wire in the near future considering recent successful experiments for wirelessly transmitting power to a destination spaced away by dozens of meters through microwaves at home and abroad.

A power transmission method through the electromagnetic induction corresponds to a scheme of transmitting power between a first coil and a second coil. When a magnet approaches the coil, an induced current is generated. A transmission side generates a magnetic field by using the induced current and a reception side generates energy through an induced current according to changes in the magnetic field. The phenomenon is referred to as the magnetic induction, and the power transmission method using magnetic induction has high energy transmission efficiency.

The power transmission method through the electromagnetic induction scheme is most commercialized, and is applied to various devices. The electromagnetic induction scheme makes up a majority of the non-contact charging technology corresponding to the wireless charging in the related art, and this technology is originally applied to products such as an electric shaver, an electric toothbrush or the like using a Nickel battery.

With respect to the resonance scheme, Prof. Soljacic of MIT announced a system in which electricity is wirelessly transferred using the power transmission principle of the resonance scheme based on a coupled mode theory even if a device to be charged is separated from a charging device by several meters. A wireless charging system of an MIT team employs the resonance concept from physics, in which when a tuning fork oscillates at a particular frequency, a wine glass next to the tuning fork oscillates at the same frequency. The research team resonated an electromagnetic wave containing electrical energy instead of resonating sounds. The resonated electrical energy is directly transferred only when there is a device having a resonance frequency and remaining electrical energy which are not used are reabsorbed into electromagnetic field instead of being spread in the air, so that it is considered that the electrical energy does not affect surrounding machines or people unlike other electromagnetic waves.

The RF/microwave radiation scheme is a new concept of power transmission scheme for converting power energy to microwave advantageous for wireless transmission and then transmitting the energy. Instead that a signal is carried on a subcarrier and then transmitted in wireless communication such as a radio, a wireless telephone or the like, only the subcarrier is transmitted in the wireless power transmission, which transmits electric energy in the wireless power transmission.

However, when power is transmitted wirelessly to a plurality of terminals, since preset power should be distributively transmitted to the plurality of terminals, the terminal most urgently requiring to be charged cannot be rapidly charged. Accordingly, it is not possible to charge the terminals according to the order intended by a user.

Further, in charging a plurality of terminals, there is no disclosed configuration of detecting a position of each of the plurality of terminals, and accordingly, it is difficult to individually control the plurality of terminals.

SUMMARY OF THE DISCLOSURE

To address the above-discussed deficiencies of the prior art, it is one object of the present disclosure to provide an apparatus and a method capable of rapidly charging a terminal which urgently requires charging through a wireless power supply.

Further, another aspect of the present disclosure is to provide an apparatus and a method capable of charging a plurality of terminals through a wireless power supply according to an order intended by a user.

Moreover, yet another aspect of the present disclosure is to provide an apparatus and a method capable of detecting positions of each of the plurality of terminals and individually controlling the terminals when charging the plurality of terminals through a wireless power supply.

In accordance with an aspect of the present disclosure, a power supply apparatus for wirelessly supplying power to one or more terminals is provided. The power supply apparatus includes a signal transceiver configured to receiving a charging state message indicating a charging state of the terminal from the one or more terminals, a display unit configured to display the charging state of each of the one or more terminals based on the charging state message, an interface unit configured to receive a charging control signal for controlling a charging operation of each of the one or more terminals, a controller configured to control the signal transceiver to transmit a power reception control signal for controlling whether the one or more terminals receive power by analyzing the charging control signal to the one or more terminals and a power supplier configured to wirelessly supply power to the one or more terminals under a control of the controller.

In accordance with another aspect of the present disclosure, a terminal for wirelessly receiving power from a power supply apparatus is provided. The terminal includes a signal transceiver configured to transmit a charging state message indicating a charging state of the terminal to the power providing apparatus, a power receiver configured to wirelessly receive power from the power supply apparatus and a controller configured to control the power receiver to control the received power based on the power reception control signal when the signal transceiver receives a power reception control signal for controlling whether the terminal receives power.

In accordance with still another aspect of the present disclosure, a control method of a power supply apparatus for wirelessly supplying power to one or more terminals is provided. The control method includes receiving a charging state message indicating a charging state of the terminal from the one or more terminals, displaying the charging state of each of the one or more terminals based on the charging state message, receiving a charging control signal for controlling charging of each of the one or more terminals, transmitting a power reception control signal for controlling whether the one or more terminals receive power analyzing the charging control signal to the one or more terminals and wirelessly supplying power to the one or more terminals.

In accordance with yet another aspect of the present disclosure, a control method of a terminal for wirelessly receiving power from a power supply apparatus is provided. The control method includes transmitting a charging state message indicating a charging state of the terminal to the power supply apparatus, receiving a power reception control signal for controlling whether the terminal receives power and wirelessly receiving power from the power supply apparatus based on the power reception control signal.

In accordance with still yet another of the present disclosure, a power supply apparatus for wirelessly supplying power to one or more terminals is provided. The power supply apparatus includes a signal transceiver configured to receive a charging state message indicating a charging state of the terminal from the one or more terminals, a display unit configured to display the charging state of each of the one or more terminals based on the charging state message, an interface unit configured to receive a charging control signal for controlling charging of the one or more terminals; a power supplier for wirelessly supplying power to one or more terminals and a controller configured to control the power supplier to control the power supplied to the one or more terminals by analyzing the charging control signal.

In accordance with a further aspect of the present disclosure, a control method of a power supply apparatus for wirelessly supplying power to one or more terminals is provided. The control method includes receiving a charging state message indicating a charging state of the terminal from the one or more terminals, displaying the charging state of each of the one or more terminals based on the charging state message, receiving a charging control signal for controlling charging of the one or more terminals and controlling the power supplied to each of the one or more terminals by analyzing the charging control signal.

According to various embodiments of the present disclosure, it is possible to detect positions of a plurality of terminals receiving power from a power supply apparatus and independently control the plurality of terminals. Accordingly, it is possible to rapidly charge a terminal urgently requiring the charging, and also charge terminals according to an order intended by the user.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
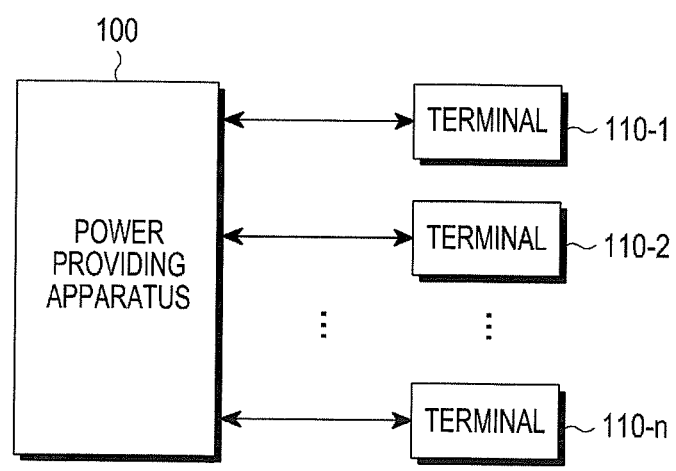
FIG. 1 is a schematic diagram illustrating wireless power transmission and signal transmission/reception between a power providing apparatus and a plurality of terminals according to an embodiment of the present disclosure.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless power transmission. Hereinafter, various embodiments of the present disclosure will be described with reference to the accompanying drawings. In the following description, the same elements will be designated by the same reference numerals although they are shown in different drawings. Further, various specific definitions found in the following description are provided only to help general understanding of the present disclosure, and it is apparent to those skilled in the art that the present disclosure can be implemented without such definitions. Further, in the following description of the present disclosure, a detailed description of known functions and configurations incorporated herein will be omitted when it may make the subject matter of the present disclosure rather unclear.

FIG. 1 is a schematic diagram illustrating power transmission and signal transmission/reception between a power providing apparatus and a plurality of terminals according to an embodiment of the present disclosure.

As illustrated in FIG. 1, a power providing apparatus 100 can wirelessly establish an electrical connection with a plurality of terminals 110-1, 110-2, and 110-n. Here, the terminals 110-1, 110-2, and 110-n can be devices transmitting a predetermined communication packet using power. Examples of the terminal may include a mobile phone, a PDA, a PMP and the like.

The power providing apparatus 100 can wirelessly transmit power to the plurality of terminals 110-1, 110-2, and 110-n. For example, the power providing apparatus 100 can transmit power to the plurality of terminals 110-1, 110-2, and 110-n through a resonant scheme. In one embodiment, when the power providing apparatus 100 adopts the resonant scheme, distances between the power providing apparatus 100 and the plurality of terminals 110-1, 110-2, and 110-n are equal to or shorter than 30m. In one embodiment, when the power providing apparatus 100 adopts an electromagnetic induction scheme, distances between the power providing apparatus 100 and the plurality of terminals 110-1, 110-2, and 110-n are equal to or shorter than 10 cm.

The power providing apparatus 100 can transmit a signal for controlling the plurality of terminals to the plurality of terminals 110-1, 110-2, and 110-n. Here, the terminal control signal can be a signal for controlling power reception of each of the plurality of terminals, which will be described below in more detail.

The terminals 110-1, 110-2, and 110-n can receive wireless power from the power providing apparatus 100 to charge batteries therein. Further, the terminal 110 can transmit/receive a signal for making a request for wireless power transmission or information required for wireless power reception through a signal for wireless power reception. In addition, the terminal 110 can transmit/receive a position information message of the terminal 110. Here, the position information message of the terminal 110 can be implemented by near field communication using. an RF signal or a Bluetooth signal, which will be described below in more detail.

Further, each of the terminals 110-1, 110-2, and 110-n can transmit a charging state message indicating a charging state to the power providing apparatus 100.

In addition, the power providing apparatus 100 can include a display means such as display, and can display charging states of the terminals 110-1, 110-2, and 110-n based on the charging state message received from each of the terminals 110-1, 110-2, and 110-n. Furthermore, the power providing apparatus 100 can also display times expected to be taken until each of the terminals 110-1, 110-2, and 110-n is completely charged.

The power providing apparatus 100 can receive the position information messages of the terminals 110-1, 110-2, and 110-n and display the position information messages to show it to the user. Accordingly, a user can detect the positions of the terminals 110-1, 110-2, and 110-n.

Further, the power providing apparatus 100 can transmit power reception control signals for controlling power reception of the terminals 110-1, 110-2, and 110-n based on the detected position of each of the terminals 110-1, 110-2, and 110-n. Each of the terminals 110-1, 110-2, and 110-n can control power reception of the terminal based on the received power reception control signal, and accordingly, a user can control power quantities supplied to the terminals by controlling the power providing apparatus 100.

Figure 2:
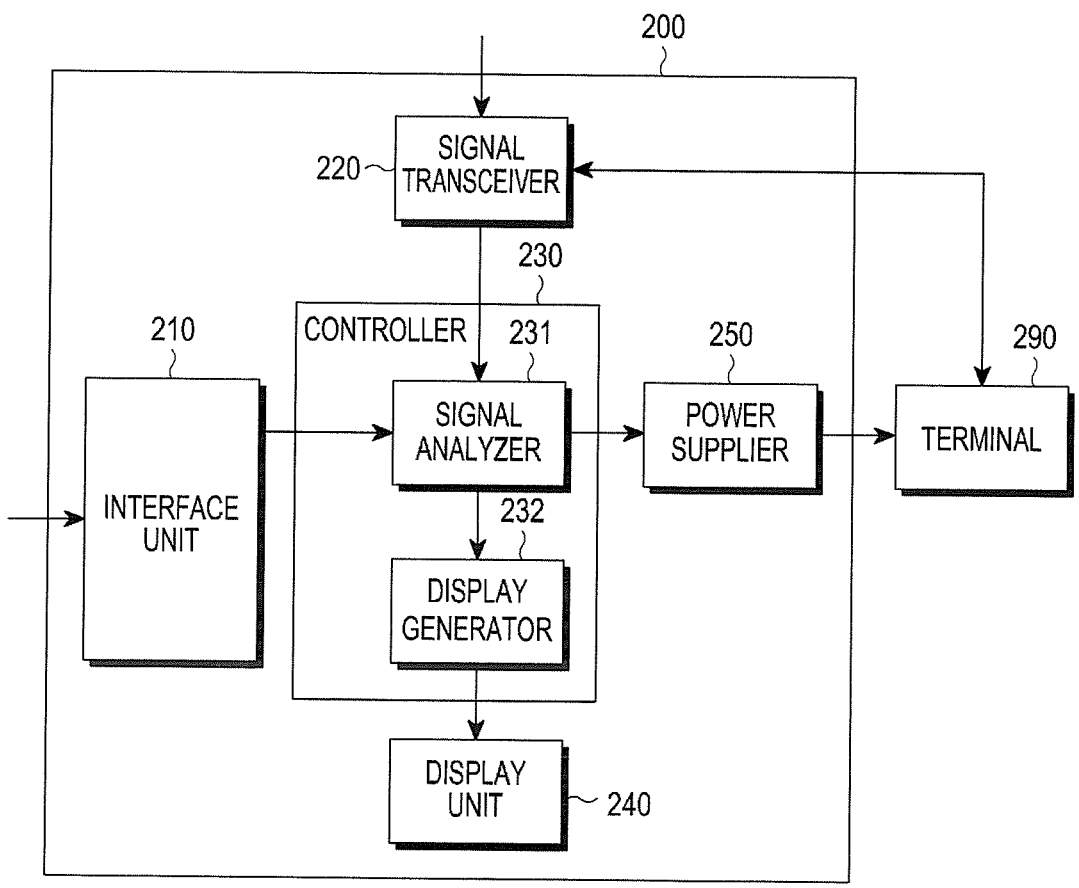
FIG. 2 is a high level block diagram of a power providing apparatus according to an embodiment of the present disclosure.

FIG. 2 is a block diagram of a power providing apparatus 200 according to an embodiment of the present disclosure. As illustrated in FIG. 2, the power providing apparatus 200 can include an interface unit 210, a signal transceiver 220, a controller 230, a display unit 240, and a power supplier 250.

The interface unit 210 can receive a charging control signal for controlling charging of the terminal from the user. Here, the charging control signal can be associated with whether a particular terminal among the plurality of terminals receives power. For example, when it is assumed that the power providing apparatus 200 supplies power to first to third terminals, the charging control signal can indicate that only the second terminal receive power, and first and third terminals postpone power reception. Further, the charging control signal can be associated with a charging speed of each terminal. For example, the charging control signal can allow that the first and third terminals perform rapid charging and the second terminal performs slow charging.

Further, the interface unit 210 can receive an input instructing to perform wireless charging at a specific time set by and from the user.

The signal transceiver 220 can receive a signal including at least one of the position information message and the charging state message indicating a current charging state of the terminal 290 from the terminal 290. Further, the signal transceiver 220 can also receive a signal including information such as an hourly electric fee and the like. The signal transceiver 220 can be implemented in a type such as a duplexer or an antenna, but it will be easily understood by those skilled in the art that there is no limitation as long as the transceiver 220 can transmit/receive a signal for an arbitrary band.

The controller 230 can include a signal analyzer 231 and a display generator 232. The signal analyzer 231 can control driving of the power supplier 250 by analyzing the position information message of the terminal 290 and the charging state message of the terminal 290 received from the signal transceiver 220, and the charging control signal received from the interface unit 210.

The controller 230 can be implemented by a medium having an operation function, such as an IC chip, a microprocessor or a CPU, or can be implemented by a minicomputer.

More specifically, the signal analyzer 231 can determine whether the terminal 290 is located in a chargeable position by using received position information of the terminal 290. When the terminal 290 is not located in the chargeable position, for example, when a distance between the terminal 290 and the power providing apparatus 200 is equal to or longer than a preset distance, the signal analyzer 231 can determine that the terminal 290 is located in an unchargeable position. Accordingly, the signal analyzer 231 can control the power supplier 250 such that power is not supplied to the terminal 290.

Meanwhile, the position information message of the terminal 290 can be implemented by near field communication using an RF signal or a Bluetooth signal. The signal analyzer 231 can determine a distance from the terminal 290 to the power providing apparatus 200 by using the RF signal. When the distance is equal to or shorter than a preset value, the signal analyzer 231 can determine that the terminal is in a chargeable state. Further, the signal analyzer 231 can determine whether the terminal is in the chargeable state based on a Bluetooth topology.

In addition, when the signal analyzer 231 determines that the terminal 290 is completely charged based on information on a current charging state of the terminal 290, the signal analyzer 231 can control the power supplier 250 such that power is not supplied to the terminal 290.

Furthermore, the signal analyzer 231 can control driving of the power supplier 250 by analyzing a signal received from the interface unit 210. For example, when the user inputs a charging control signal indicating a charging initiation into the interface unit 210, the interface unit 210 can output the signal to the signal analyzer 231. The signal analyzer 231 analyzes the charging control signal to determine that the user control signal indicates the initiation of the charging, and the signal analyzer 231 can control the power supplier 250 such that power is supplied to the terminal 290.

Further, the charging control signal input into the interface unit 210 can include information on a charging initiation time. For example, when the user desires to initiate the charging of the terminal 290 after a particular time period passes, the user can input the user control signal indicating the charging initiation after a preset time into the interface unit 210, and the signal analyzer 231 having received the user control signal can analyze the user control signal to control the power supplier 250 such that power is supplied to the terminal 290 after the particular time passes.

Further, the signal analyzer 231 can control the power supplier 250, based on information received from the outside by the signal transceiver 220. For example, the signal transceiver 220 can receive a signal containing hourly electric fee information from the outside, and output the signal to the signal analyzer 231. The signal analyzer 231 analyzes the signal to control the power supplier 250 such that power is supplied to the terminal 290 at the time when an hourly electric fee is lowest.

Further, the signal analyzer 231 can generate a power reception control signal for controlling power reception of the terminal 290 based on the charging control signal received from the interface unit 210 and outputs the generated power reception control signal to the signal transceiver 220. The signal transceiver 220 can transmit the received power reception control signal to the terminal 290.

Here, the charging control signal received from the interface unit 210 can allow a charging order of the particular terminal 290 to have a higher priority compared to another terminal (not shown). For example, when it is assumed that that power providing apparatus 200 supplies power to the first to third terminals, the charging control signal can be a signal indicating that the charging is performed only for the second terminal, and the charging is postponed for the remaining first and third terminals.

The signal analyzer 231 can transmit the signal indicating the postponement of charging the first to third terminals and transmit the signal indicating the charging of the second terminal by analyzing the received charging control signal.

Meanwhile, for example, the user can input the charging control signal indicating the charging of the terminals in an order of the second terminal, the first terminal, and the third terminal into the interface unit 210. As described above, the signal analyzer 231 can transmit the power reception control signal indicating the reception of power to the second terminal, and transmit the power reception control signal indicating the postponement of power reception to each of the first to third terminals. Thereafter, the signal transceiver 220 can receive the charging state message from each terminal. When it is determined that the second terminal is completely charged, the signal analyzer 231 can transmit the power reception control signal indicating the power reception to the first terminal, and transmit the power reception control signal indicating the postponement of the power reception to each of the second and third terminals. Further, when it is determined that the first terminal is completely charged, the signal analyzer 231 can transmit the power reception control signal indicating the power reception to the third terminal, and transmit the power reception control signal indicating non-reception power to each of the first and second terminals, and accordingly, the power providing apparatus 200 can supply power to each of a plurality of terminals according to the charging order entered by the user.

The signal analyzer 231 can determine the current charging state and the expected charging completion time of the terminal 290 based on the charging state of the terminal 290 received from the signal transceiver 220 and the charging control signal received from the interface unit 210.

The signal transceiver 220 can receive a charging state message containing a current charging state such as a power quantity or a charging rate expressed in percentage format from the terminal 290. The signal analyzer 231 can determine current charging quantity of the terminal 290 by analyzing the charging state message. The signal analyzer 231 can determine the current charging state by comparing pre-stored power information of each terminal with the currently charged power quantity contained in the received charging state message. Alternatively, the signal controller 231 can determine the current charging state in percentage format expressing the charging rate received from the signal transceiver 220.

The signal transceiver 220 can determine the expected charging completion time of the terminal 290 based on the determined current charging state and the charging control signal received from the interface unit 210.

For example, it is assumed that the number of terminals receiving power from the power providing apparatus 200 is three including the first to third terminals and maximum power supplied by the power supplier 250 is 900 W. In this case, when the charging control signal input into the interface unit 210 is the signal indicating that only the first and second terminals receive power and the third terminal postpones the power reception, each of the first and second terminals can receive the power of 450 W if the power supplier 250 supplies power of 900 W. When the signal transceiver 220 receives the charging state message indicating that a maximum charging quantity of the first terminal is 900 Wh and a current charging quantity is 450 Wh and the charging state message indicating that a maximum charging quantity of the second terminal is 1300 Wh and a current charging quantity is 400 Wh, the signal analyzer 231 can determine the expected charging completion time of the first terminal as one hour and the expected charging completion time of the second terminal as two hours based on the charging state message and the charging control signals of each terminal.

The signal analyzer 231 can output the position information message, charging control signal, charging state message, and the determined current charging state and expected charging completion time of each terminal to the display controller 232.

The display controller 232 can generate graphic or text data describing at least one of the position, the current charging state, the charging order, and the expected charging completion time based on the input position information message, charging control signal, charging state message, and the determined current charging state and expected charging completion time of each terminal, and output the generated graphic data to the display unit 240.

The display unit 240 can display at least one of the position, the current charging sate, the charging order, and the expected charging completion time of each terminal in a form visually recognizable by the user based on the graphic or text data received from the display controller 232. When the terminal is placed in an unchargeable position, the display unit 240 can display a message indicating that the terminal cannot be charged. Further, the display unit 240 can display the current charging state in a bar type or a percentage format, and can display the charging order and the expected charging completion time in numbers.

The power supplier 250 can supply power to the terminal 290 under the control of the controller 230. In some embodiments, the power supplier 250 includes a drive circuit and an electromagnetic resonator when the power providing apparatus adopts the resonant scheme. Alternatively, the power supplier 250 includes the drive circuit and a primary coil when the power providing apparatus adopts the electromagnetic induction scheme.

The power supplier 250 can radiate an electromagnetic wave of a preset frequency by performing resonance for a specific time period from a particular time under the control of the controller 230. Alternatively, the power supplier 250 can apply power to the coil for a specific time period from a particular time under a control of the controller 230.

The electromagnetic wave radiated from the power supplier 250 can be received by a resonator having the same resonance frequency located near the power providing apparatus. For example, the terminal 290 can include a resonator having the same resonance frequency as that of the electromagnetic wave radiated from the power supplier 250, and accordingly, the terminal 290 can wirelessly receive power from the power supplier 250.

According to the above-described disclosure, the user can easily detect the position of each terminal. Further, the user can detect the case where the terminal is located in the unchargeable position through a display of the display unit 240, and accordingly, the user can re-place the terminal in the chargeable position. In addition, when there is a charging priority desired by the user, it is possible to create an effect of rapidly charging a terminal having a priority by controlling such that a terminal excluded from the priority postpones power reception.

Figure 3:
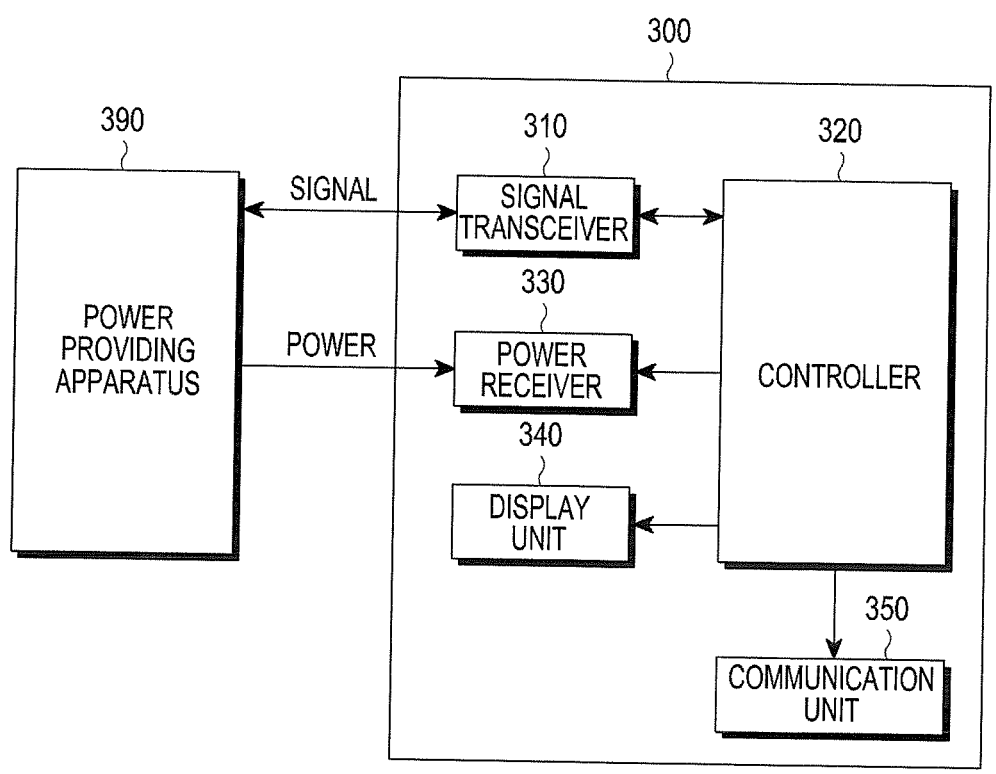
FIG. 3 is a high level block diagram of a terminal according to an embodiment of the present disclosure.

FIG. 3 is a high level block diagram of a terminal according to an embodiment of the present disclosure. As illustrated in FIG. 3, a terminal 300 is electrically connected to a power providing apparatus 390, and the terminal 300 can include a signal transceiver 310, a controller 320, a power receiver 330, a display unit 340 and a communication unit 350.

The signal transceiver 310 can transmit a position information message containing information on a position of the terminal 300 to the power providing apparatus 390. As described above, the position information message can be a short-range signal such as an RF signal or a Bluetooth signal. Further, the signal transceiver 310 can transmit a charging state message indicating a current charging state of the terminal 300 to the power providing apparatus 390.

In addition, the signal transceiver 310 can receive a power reception control signal from the power providing apparatus 390. As described above, the power reception control signal can indicate whether the terminal 300 receives power from the power providing apparatus 390.

The controller 320 can control whether the power receiver 330 receives power from the power providing apparatus 390 based on the received power reception control signal.

The power receiver 330 can receive the power from the power providing apparatus 390 or postpone power reception under a control of the controller 320. When the power providing apparatus 390 adopts the resonant scheme, the power receiver 330 can include a resonator having the same resonance frequency as a frequency of an electromagnetic wave radiated from an electromagnetic wave resonator of the power providing apparatus 390. Further, the power receiver 330 can further include a rectification circuit connected to the resonator to rectify the received power.

Meanwhile, when the power providing apparatus 390 adopts the electromagnetic induction scheme, the power receiver 330 can include a secondary coil and can further include the rectification circuit.

When the charging control signal indicates that the terminal 300 postpones power reception, the power receiver 330 changes a resonance frequency to postpone the power reception from the power providing apparatus 390 under a control of the controller 320. Alternatively, the power receiver 330 can further includes a switch connected to a resonator, and can turn off the switch to postpone power reception when the power charging control signal indicates that the terminal 300 postpones the power reception.

When the power providing apparatus 390 adopts the electromagnetic induction scheme, the power receiver 330 can postpone power reception by turning off a switch connected to the secondary coil.

Meanwhile, the display unit 340 can be a means for displaying a general display of the terminal, and the communication unit 350 can be a means for performing a general communication function of the terminal.

As described above, according to the charging control signal set by a user, each terminal can receive power or postpone power reception, and accordingly, the user can charge each terminal in a charging order desired by the user. Further, as the terminal 300 transmits the position information message to the power providing apparatus 390, the user can identify whether the terminal 300 is placed in a chargeable position.

Figure 4:
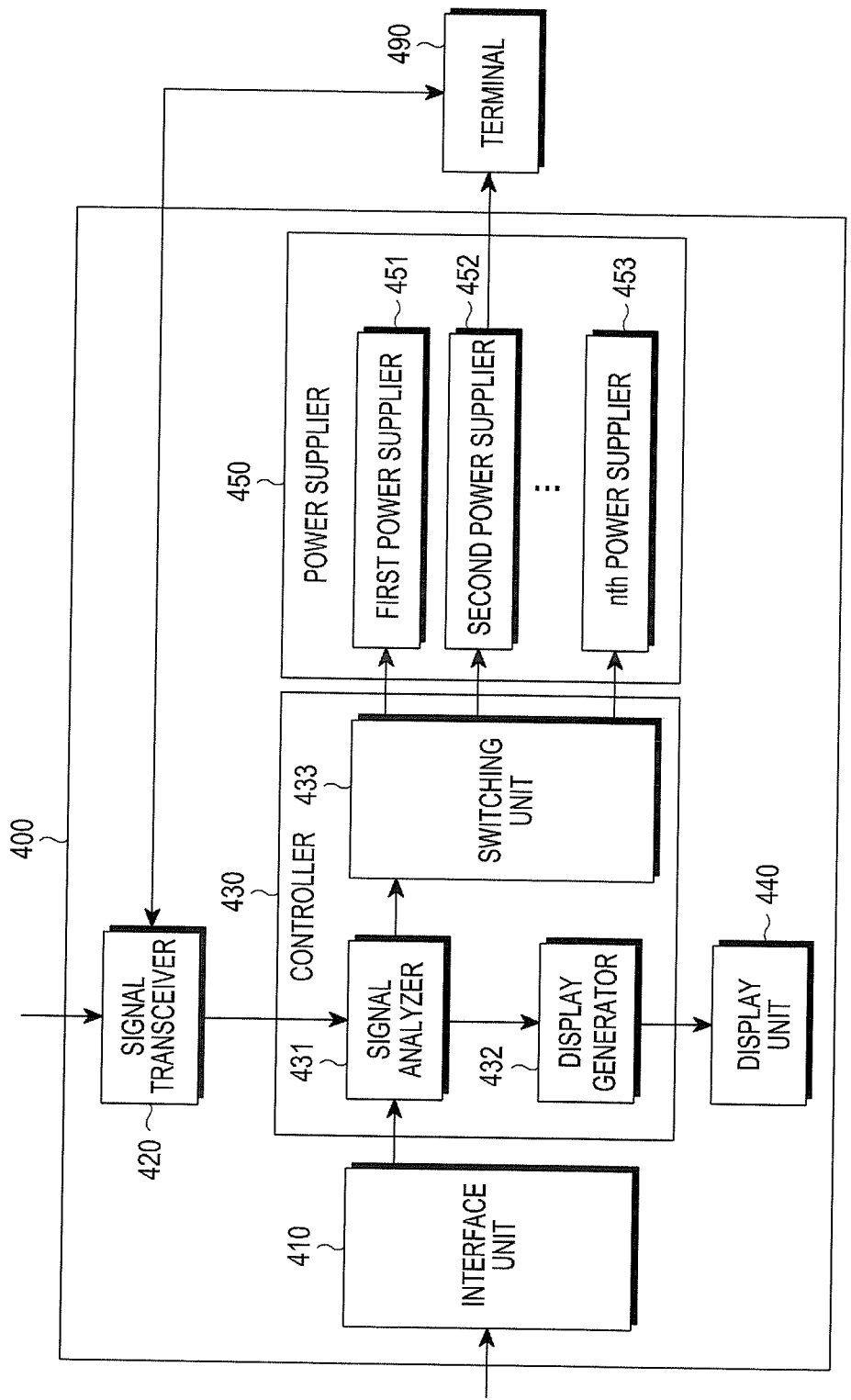
FIG. 4 is a high level block diagram of a power providing apparatus according to another embodiment of the present disclosure.

FIG. 4 is a high, level block diagram of a power providing apparatus according to another embodiment of the present disclosure. As illustrated in FIG. 4, a power providing apparatus 400 can include an interface unit 410, a signal transceiver 420, a controller 430, a display unit 440, and a power supplier 450. Meanwhile, descriptions of the components of the power providing apparatus 400 according to the embodiment illustrated in FIG. 4, which perform the same functions as those of the components of the power providing apparatus 200 according to the embodiment illustrated in FIG. 2 will be omitted or briefly made.

The controller 430 can include a signal analyzer 431, a display generator 432, and a switching unit 433. Although it is illustrated that the controller 430 includes the switching unit 433 in FIG. 4, the switching unit 433 can be included in the power supplier 450.

A difference between the power providing apparatus 200 according to the embodiment illustrated in FIG. 2 and the power providing apparatus 400 according to the embodiment illustrated in FIG. 4 is only that the controller 430 and the power supplier 450 of FIG. 4 are different from those of FIG. 2.

The signal analyzer 431 can generate a signal for controlling the power supplier 450 in the similar way as that of the signal analyzer 231 illustrated in FIG. 2. The signal analyzer 231 according to the embodiment illustrated in FIG. 2 transmits the power reception control signal to each terminal in order to allow a particular terminal to receive power or to postpone power reception. In contrast, the power providing apparatus 400 according to the embodiment illustrated in FIG. 4 includes a plurality of sub power suppliers for supplying power to each terminal, for example, a first power supplier to an n-th power supplier (451, 452, and 453). Each of the sub power suppliers 451, 452, and 453 can be matched with each corresponding terminal in one-to-one correspondence to supply power.

The signal analyzer 431 can control the switching unit 433 based on the charging control signal input into the interface unit 410 to determine whether each of the sub power suppliers 451, 452, and 453 supplies power or postpones power supply.

In the embodiment illustrated in FIG. 4, the charging control signal can supply power only to the terminal 490 matched with the second power supplier 452. The signal analyzer 431 can control such that only the second power supplier 452 supplies power to the terminal 490 by analyzing the charging control signal to control the switching unit. Accordingly, a user can charge a plurality of terminals according to the order desired by a user.

Figure 5:
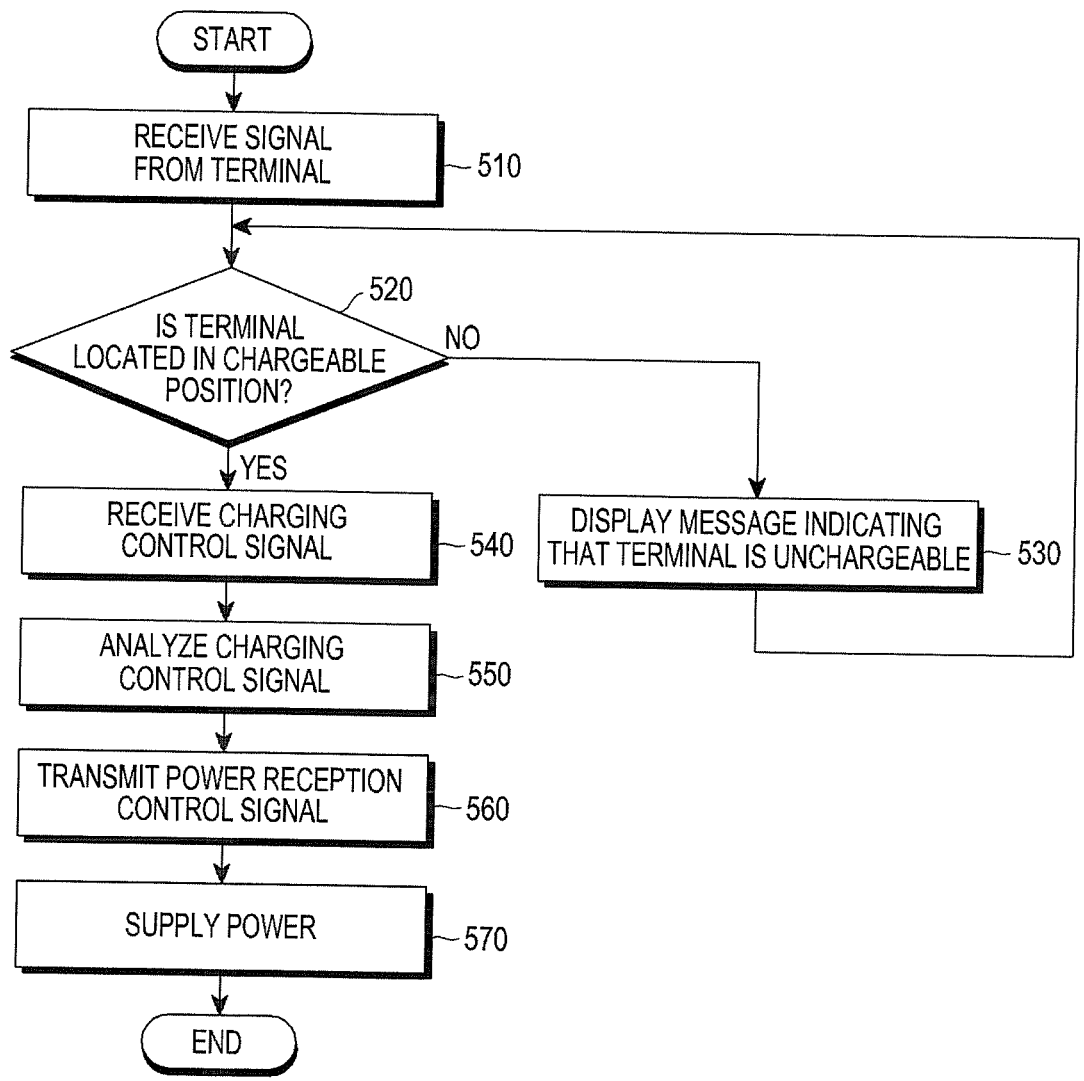
FIG. 5 is a flowchart illustrating a method for operating a power providing apparatus according to an embodiment of the present disclosure.

FIG. 5 is a schematic flowchart illustrating a method for operating the power providing apparatus according to an embodiment of the present disclosure. More specifically, the flowchart of FIG. 5 is performed by the power providing apparatus 200 illustrated in FIG. 2.

The power providing apparatus can receive at least one of a position information message and a charging state message from the terminal in step S510. The power providing apparatus can determine whether the terminal is disposed in a chargeable position based on the position information message received from the terminal in step S520. As described in detail above, whether the terminal is located in the chargeable position can be determined by a short-range signal such as an RF signal or a Bluetooth signal, and a repeated description thereof will be omitted.

When a particular terminal is located in an unchargeable position, the power providing apparatus can indicate that the terminal cannot be charged in step S530.

When the terminal is disposed in the chargeable position in step S520-Y, the power providing apparatus can receive the charging control signal from the user in step S540. Meanwhile, the power providing apparatus can display the current charging state of each terminal based on the charging state message, and the user can input the charging control signal based on the displayed current charging state. As described above, the charging control signal can be associated with whether a particular terminal of a plurality of terminals receives power.

The power providing apparatus can analyze the received charging control signal in step S550. The power providing apparatus can transmit a power reception control signal to each terminal based on the analysis result of the charging control signal in step S560. Here, as described above, the power reception control signal can indicate whether the particular terminal receives power or postpones power reception.

Each of the plurality of terminals connected to the power providing apparatus can receive power or postpone power reception based on the received power reception control signal.

The power providing apparatus can supply power to each of the plurality of terminals in step S570, and only the terminal determined to receive power among the terminals can receive the power.

Meanwhile, although not illustrated in FIG. 5, the power providing apparatus can display at least one of the position, the current charging state, the charging order, and the expected charging completion time of the terminal in a form visually recognizable by the user. The user can change the charging order of the terminal or the position of the terminal based on the displayed information.

According to the above-described method, the user can charge each terminal in the charging order desired by the user, and the user can also determine whether the terminal is in a chargeable range.

In response to the above operation, the terminal can first transmit at least one of the position information message and the charging state message to the power providing apparatus. In response to the reception, when the power providing apparatus transmits the charging control signal message, the terminal can receive the charging control signal message. The terminal can determine whether to receive power or postpone power reception based on the received charging control signal.

Figure 6:
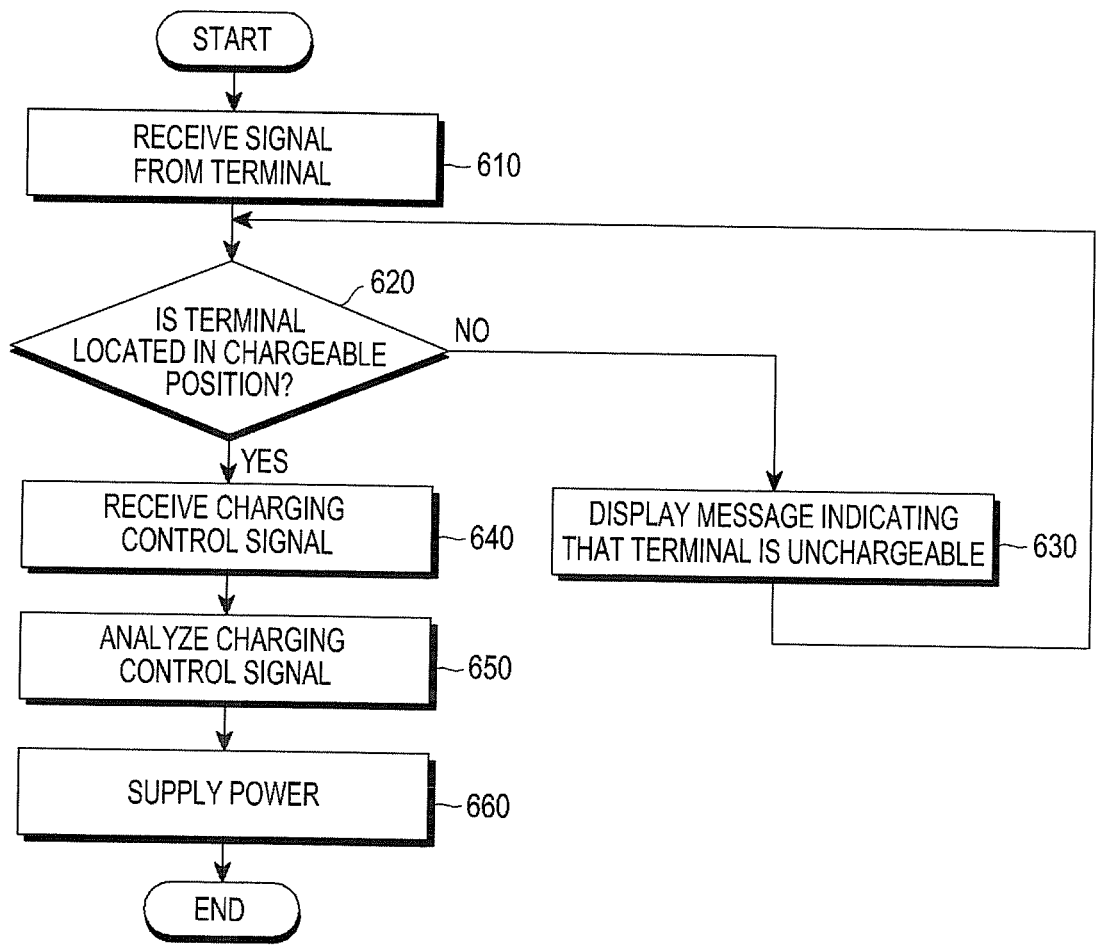
FIG. 6 is a flowchart illustrating a method for operating a power providing apparatus according to another embodiment of the present disclosure.

FIG. 6 is a flowchart illustrating a method for operating the power providing apparatus according to another embodiment of the present disclosure. More specifically, the method is for operating the power providing apparatus 400 illustrated in FIG. 4.

The power providing apparatus can receive at least one of the position information message and the charging state message in step S610. The power providing apparatus can determine whether the terminal is located in a chargeable position based on the position information message received from the terminal in step S620. As described in detail above, whether the terminal is located in the chargeable position can be determined by a short-range signal such as an RF signal or a Bluetooth signal, and a repeated description thereof will be omitted.

When a particular terminal is disposed in an unchargeable position, the power providing apparatus can indicate that the terminal cannot be charged in step S630.

When the terminal is placed in the chargeable position in step S630-Y, the power providing apparatus can receive the charging control signal from the user in step S640. Meanwhile, the power providing apparatus can display a current charging state of each terminal based on the charging state message, and a user can input to generate the charging control signal based on the displayed current charging state. As described above, the charging control signal can be associated with whether a particular terminal among a plurality of terminals will receive power. The power providing apparatus can analyze the received charging control signal in step S650. The power providing apparatus can control power supplied to each terminal based on an analysis result of the charging control signal. The power providing apparatus can supply the controlled power to each terminal in step S660.

Meanwhile, although not illustrated in FIG. 6, the power providing apparatus can display at least one of the position, the current charging state, the charging order, and the expected charging completion time of the terminal in a form visually recognizable by the user. The user can change the charging order of the terminal or the position of the terminal based on the displayed information.

According to the above-described method, the user can charge each terminal in the charging order desired by a user, and the user can also determine whether the terminal is in a chargeable range.

Figure 7:
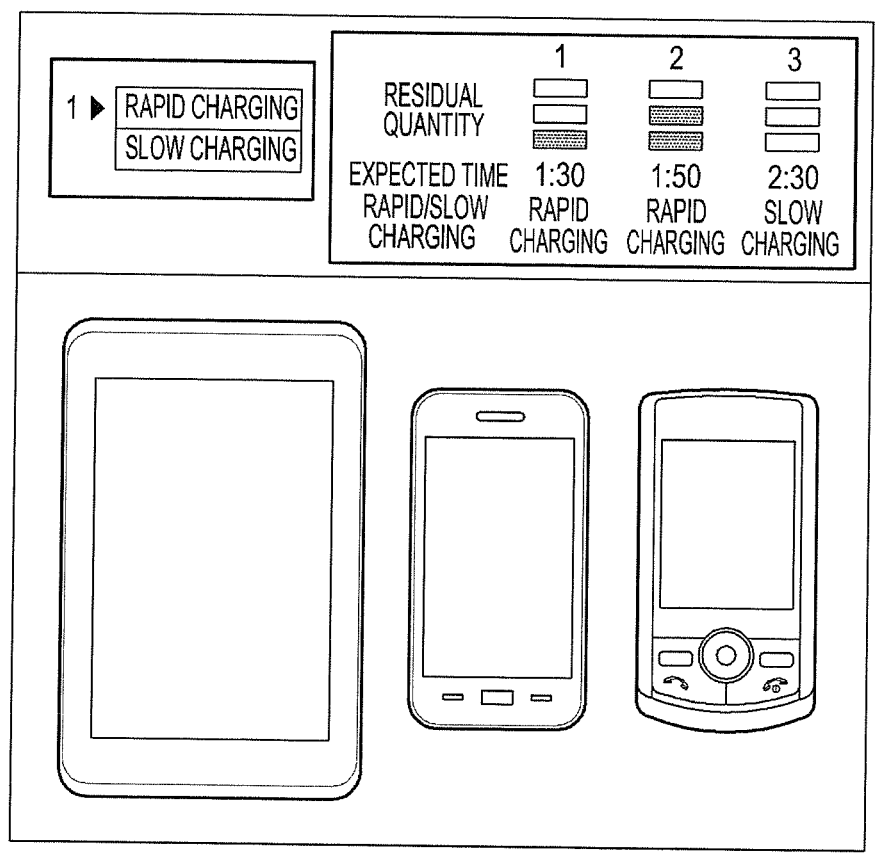
FIG. 7 is a schematic diagram illustrating a power providing apparatus and a terminal according to an embodiment of the present disclosure.

FIG. 7 is a schematic diagram illustrating the power providing apparatus and the terminal according to an embodiment of the present disclosure.

As illustrated in FIG. 7, the terminal can wirelessly receive power from the power providing apparatus. The power providing apparatus can display a current charging state and an expected charging completion time. Further, the power providing apparatus can control a charging speed of each terminal by controlling the power supplied to each terminal.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A power supply apparatus for wirelessly supplying power to
a plurality of terminals, the power supply apparatus comprising:
a transceiver configured to receive terminal information from each of the plurality of terminals;
a power supplier configured to wirelessly supply power to the plurality of terminals; and a controller configured to:
identify a position information corresponding to each of the plurality of terminals based on a radio frequency (RF) signal received from each of the plurality of terminals,
control a display to display whether each of the plurality of terminals is chargeable,
based on the identified position information,
obtain a setting information for setting a charging order of the plurality of terminals, wherein the setting information for setting the charging order is set by a user input and the setting information for setting the charging order comprises user selection information corresponding to a specific terminal for preferentially charging at least one terminal selected by the user input among the plurality of terminals for which the terminal information of each of the plurality of terminals has been received,
identify the charging order of the plurality of terminals based at least in part on the setting information,
control the power supplier to sequentially transmit, to each of the plurality of terminals, power based at least in part on the identified charging order, wherein, if the identified charging order indicates that a first terminal among the plurality of terminals is selected to be preferentially charged over a second terminal among the plurality of terminals, the controller is further configured to control to start charging the second terminal after charging of the first terminal is completed, and
based on the identified position information, control the transceiver to transmit a power reception control signal to each of the plurality of terminals, wherein the power reception control signal indicates whether each of the plurality of terminals postpones power reception by changing a resonance frequency of each of the plurality of terminals.

2. The power supply apparatus of claim 1, wherein
the controller is configured to control the display to display positions of the plurality of terminals based on the identified position information.

3. The power supply apparatus of claim 1, wherein, when the plurality of terminals are within a preset distance from the power supplier, the controller is configured to control the display to display whether the plurality of terminals are chargeable.

4. The power supply apparatus of claim 1, wherein the controller is configured to control the display to display whether the plurality of terminals are chargeable based on a short range wireless communication topology between the plurality of terminals and the power supplier.

5. The power supply apparatus of claim 1, wherein the controller is configured to determine expected charging completion times of the plurality of terminals based on charging state information, and to control the display to display the expected charging completion times.

6. The power supply apparatus of claim 5, wherein the controller is configured to determine the expected charging completion times of the plurality of terminals based on the power reception control signal and the supplied power, and to control the display to display the expected charging completion times.

7. The power supply apparatus of claim 6, wherein the power reception control signal is associated with whether each of the plurality of terminals receives power.

8. The power supply apparatus of claim 1, further comprising a display configured to display identification information of each of the plurality of terminals.

9. The power supply apparatus of claim 1, wherein the controller is further configured to control to provide identification information of the plurality of terminals based on the received terminal information for display.

10. A method for wirelessly supplying power from a power supply apparatus to a plurality of terminals, the method comprising:
identifying a position information corresponding to each of the plurality of terminals based on a radio frequency (RF) signal received from each of the plurality of terminals;
displaying whether each of the plurality of terminals is chargeable, based on the identified position information;

receiving terminal information from each of the plurality of terminals;

receiving a setting information for setting a charging order of the plurality of terminals, wherein the setting information for setting the charging order is set by a user input and the setting information for setting the charging order comprises user selection information corresponding to a specific terminal for preferentially charging at least one terminal selected by the user input among the plurality of terminals for which the terminal information of each of the plurality of terminals has been received;

identifying the charging order of the plurality of terminals based at least in part on the setting information; and sequentially transmitting, to each of the plurality of terminals, power based at least in part on the identified charging order, wherein, if the identified charging order indicates that a first terminal from among the plurality of terminals is selected to be preferentially charged over a second terminal from among the plurality of terminals, charging the second terminal is started after charging of the first terminal is completed, and based on the identified position information, control the transceiver to transmit a power reception control signal to each of the plurality of terminals, wherein the power reception control signal indicates whether each of the plurality of terminals postpones power reception by changing a resonance frequency of each of the plurality of terminals.

11. The method of claim 10, further comprising:
displaying positions of the plurality of terminals based on the identified position information.

12. The method of claim 10, further comprising:
displaying whether the plurality of terminals are chargeable when the plurality of terminals are within a preset distance from the power supply apparatus.

13. The method of claim 10, further comprising:
displaying whether the plurality of terminals are chargeable based on a short range wireless communication topology between the plurality of terminals and the power supply apparatus.

14. The method of claim 10, further comprising:
displaying a charging state,
wherein displaying the charging state comprises determining expected charging completion times of the plurality of terminals based on the received terminal information and displaying the expected charging completion times.

15. The method of claim 14, wherein displaying the charging state comprises determining expected charging completion times of the plurality of terminals based on the power reception control signal and the supplied power, and displaying the expected charging completion times.

16. The method of claim 15, wherein the power reception control signal is associated with whether each of the plurality of terminals receives power.

17. The method of claim 10, further comprising displaying identification information of each of the plurality of terminals.

18. The method of claim 10, further comprising providing identification information of the plurality of terminals based on the received terminal information for display.

* * * * *